US008514918B2

(12) United States Patent
Cohen

(10) Patent No.: US 8,514,918 B2
(45) Date of Patent: Aug. 20, 2013

(54) CLOSE-LOOP POWER TRANSMISSION CALIBRATION

(75) Inventor: Emanuel Cohen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 342 days.

(21) Appl. No.: 12/924,294

(22) Filed: Sep. 24, 2010

(65) Prior Publication Data

US 2012/0076188 A1    Mar. 29, 2012

(51) Int. Cl.
*H04B 17/00*    (2006.01)
*H03H 7/40*    (2006.01)
*H04L 27/00*    (2006.01)

(52) U.S. Cl.
USPC ............ 375/224; 375/316; 375/229; 370/260

(58) Field of Classification Search
None
See application file for complete search history.

(56) References Cited

U.S. PATENT DOCUMENTS

| 2008/0159435 | A1* | 7/2008 | Cohen ............................ 375/297 |
| 2011/0068868 | A1* | 3/2011 | Shi et al. ........................ 330/149 |
| 2011/0130105 | A1* | 6/2011 | Chan et al. ................. 455/127.2 |

FOREIGN PATENT DOCUMENTS

| KR | 10-2004-0065470 A | 7/2004 |
| KR | 10-2010-0045245 A | 5/2010 |
| WO | 2012/040690 A1 | 3/2012 |

OTHER PUBLICATIONS

Athens, "UL L1/L2 Control Signals with Data: Multiplexing Detail", Motorola, 3GPP TSG RAN1#50, R1-073388, Aug. 20-24, 2007, 3 pages.
International Search Report and Written Opinion received for PCT Patent Application No. PCT/US2011/053210, mailed on Feb. 21, 2012, 9 pages.
International Preliminary Report on Patentability Received for PCT Patent Application No. PCT/US2011/053210, mailed on Apr. 4, 2013, 6 pages.

* cited by examiner

*Primary Examiner* — Chieh M Fan
*Assistant Examiner* — Bahman Badipour
(74) *Attorney, Agent, or Firm* — Forefront IP Lawgroup, PLLC

(57) ABSTRACT

A close-loop power calibration algorithm is performed on a wireless communication device to correct power amplifier pre-distortion or PADR correction curves. In addition to peak to average power ratio or PAPR detection techniques, an algorithm or process is implemented that uses a transmitted reference packet, such as an orthogonal frequency domain multiplexing (OFDM) packet. The reference packet is used to learn the linear response of a detector that measures output of the power amplifier. The transmitted packet can include a linear response. The included linear response can determined by subtracting a normal packet from the reference packet.

14 Claims, 4 Drawing Sheets

CLOSE-LOOP POWER TRANSMISSION CALIBRATION

BACKGROUND

For a wireless communication device, such as a broadband wireless communication device, calibration can be performed to assure that accurate radio frequency (RF) power is transmitted at an antenna and antenna connector of the wireless communication device. The calibration can be sensitive to the effects of impedance of the antenna connector. Such impedance can be referred to, or attributable to, voltage standing wave ratio (VSWR) effects.

The wireless communication device may use a close-loop reading for power calibration and power amplifier (PA) pre-distortion or PAPD correction. The close-loop reading can be used to reach accuracy in power, and for mask correction in product development. In certain cases, a detector is placed at the output of the PA. Sampled data from the PA, after loop-back, can be multiplied by a detector frequency response which occurs due to limited VSWR at an antenna port (i.e., antenna connector) of the wireless communication device.

Response from the detector can create problems in the close-loop design, affecting different calibrations and processes that may be performed on the wireless communication device. For example, detected peaks of an orthogonal frequency division multiplexing or OFDM signal may change, causing a problem with peak to average power ratio or PAPR detection that is performed. PAPD correction curves can become noisy, making it difficult to extract amplitude modulated (AM) and phase modulated (PM) responses.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Overview

In a wireless communication device (i.e., wireless communication system) that includes a wireless transmitter module, a correction is performed using an algorithm or procedure that uses a loop-back or close-loop to correct power amplifier pre-distortion or PAPD correction curves. For example, power detection error can be reduced from 1.0 dB to about 0.1 dB under VSWR change. Furthermore, extracting AM/PM curves of the power amplifier (PA) can be performed. Implementation of the close-loop with the algorithm can lead to optimized maximum output power and PA efficiency, increasing throughput while saving power consumption with no additional hardware to the wireless communication device.

In an implementation, in order to get accurate readings of power detection in the close-loop, relative reading measurements can be based on a relative reading using preexisting peak to average power ratio or PAPR detection techniques; however, since preexisting PAPR techniques may be sensitive to VSWR change, and to adjust to actual operational conditions, the following algorithm and techniques can be implemented.

In general, the algorithm or process includes a transmitted packet, such as an orthogonal frequency domain multiplexing (OFDM) packet. The transmitted packet is used to learn the linear response of a detector at measuring the output of the PA. This can be implemented by using a low power transmitted packet. The linear response can found by subtracting the actual transmitted packet from the reference packet, which is based on the property that the linear response is preserved after PA non-linearity and therefore the low power packet can be used to subtract the linear response, as further discussed below. This implementation makes use of relatively few computations, and implements the use of an additional packet to be transmitted as a reference. Another implementation that is relatively more complex extracts a response from the PA and coupler (i.e., output from a radio frequency integrated circuit or RFIC and coupler), from pilot signals, and equalizes a received signal.

Example Wireless Communication Device

Figure 1:
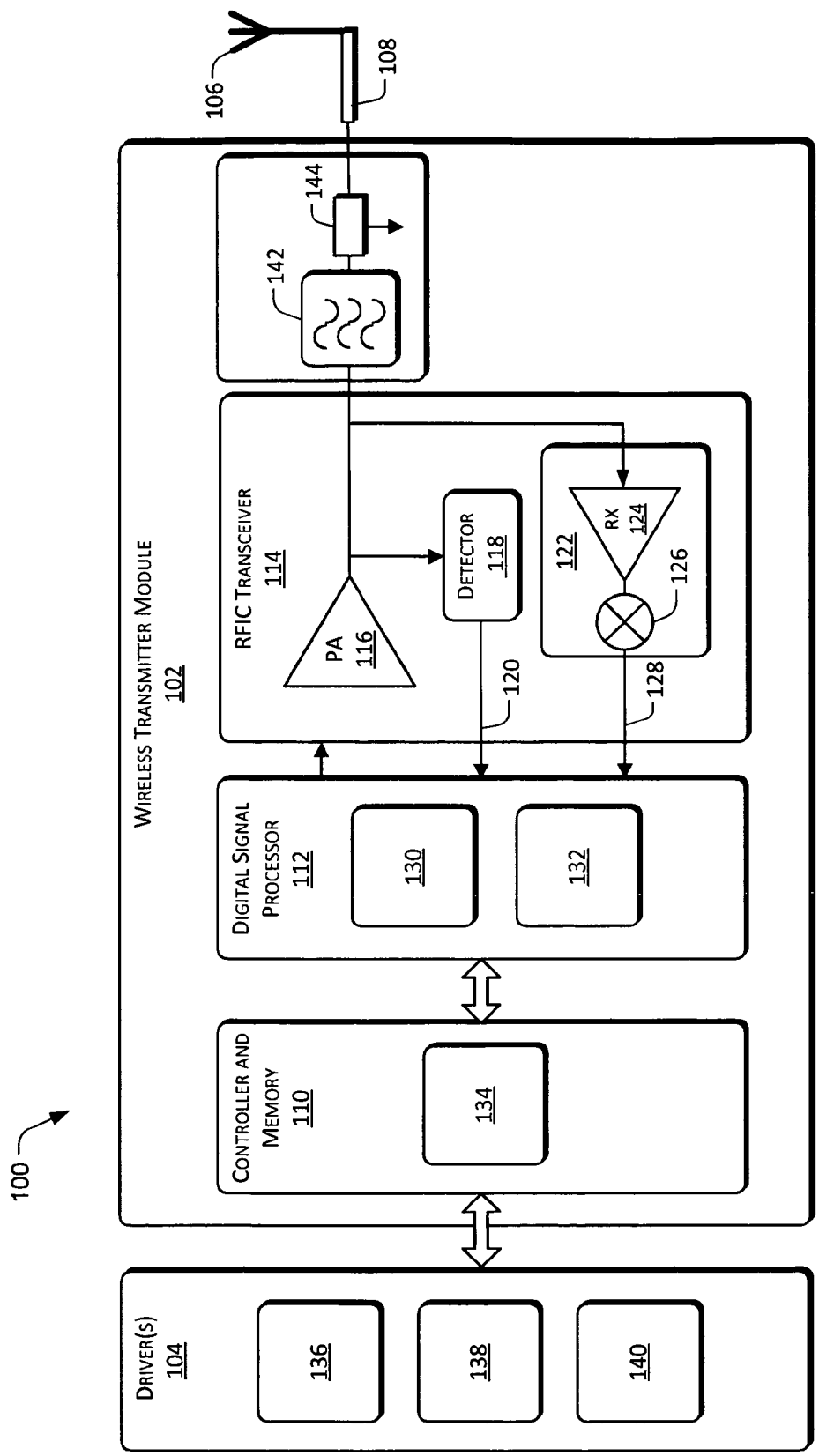
FIG. 1 is a block diagram of an example wireless communication device according to some implementations.

FIG. 1 shows an example wireless communication device 100. The wireless communication device 100 uses a close-loop calibration algorithm procedure to assure accurate power transmission.

The wireless communication device 100 can include broadband devices, such as laptops, net books, personal digital assistants (PDAs), e-readers, smart phones, etc. It is also contemplated that wireless communication device 100 can include voice only devices, such as cellular telephones.

In this implementation, the wireless communication device 100 includes a wireless transmitter module 102, and driver(s) 104. In certain cases, the wireless transmitter module 102 can be implemented in hardware, for example as part of an integrated circuit in silicon. The driver(s) 104 in certain cases can be implemented in software and/or firmware. The wireless device includes one or more antenna(e) 106 to receive and transmit RF powered signals. Lines, cables and/or ports, as represented by connector 108, connect wireless transmitter module 102 with antenna(e) 106. Measurements can be taken at antenna(e) 106 for power output.

The wireless communication device 100 can further include one or more processor(s) (not shown) and memory (not shown), configured to communicate with and process the procedures of the described components of wireless communication device 100. In certain cases, driver(s) 104 can be implemented as part of the memory. The memory can include computer readable storage media configured to perform the described methods.

The wireless transmitter module 102 can include a dedicated internal controller and memory 110, a digital signal processor (DSP) 112, and a radio frequency integrated circuit (RFIC) transceiver 114. The controller and memory 110 can include computer readable storage media. The RFIC transceiver 114 includes a power amplifier or PA 116 and detector 118. The PA 116 provides a signal sent to antenna(e) 196. Furthermore, the PA 116 creates a "channel" to the connector 108.

The detector 118 reads the power at power amplifier 116, and provides a signal on line 120 to DSP 112. The RFIC transceiver 114 includes a loop-back chain 122. The loop-back chain 122 receives an output from the power amplifier 116 through a receiver 124. The receiver 124 can amplify the received signal. A mixer 126 is included in the loop-back chain 122. A loop-back response signal is provided at line 128. In particular, the loop-back chain 122 is used along with a transmitted OFDM packet, as described below, to determine or learn a linear response at the detector 118 (i.e., output of the power amplifier 116). The linear response can be determined by subtracting the transmitted OFDM packet from the actual measurement at the detector 118.

In this implementation, DSP 112 includes a module 130 that transmits reference packets, or packets in attenuation mode or low power mode. The transmitted reference packets may be OFDM packets. The DSP 112 also includes a module 132 that transmits packets in normal mode. The reference packets and packets in normal mode are further discussed below.

The internal controller and memory 110 can include particular modules to process and/or pass on data. In this example, a module 132 is configured to control data transfer to and from the DSP 112 and the RFIC transceiver 114, and the driver(s) 104. The driver(s) 104 in this example, includes a module 136 configured to extract the loopback response (i.e., signal on line 128) and equalize received packets. The driver(s) 104 include a module 138 configured to filter an amplitude modulated (AM) to AM response curve(s) and extract peak power. Another module 140 can be configured to calculate PAPR correction value.

The output of the PA 116 can be sent to and processed by one or more filter(s) 142. In certain implementations, a directional coupler 144 can be included. The directional coupler 136 can be implemented to reduce channel errors.

Figure 2:
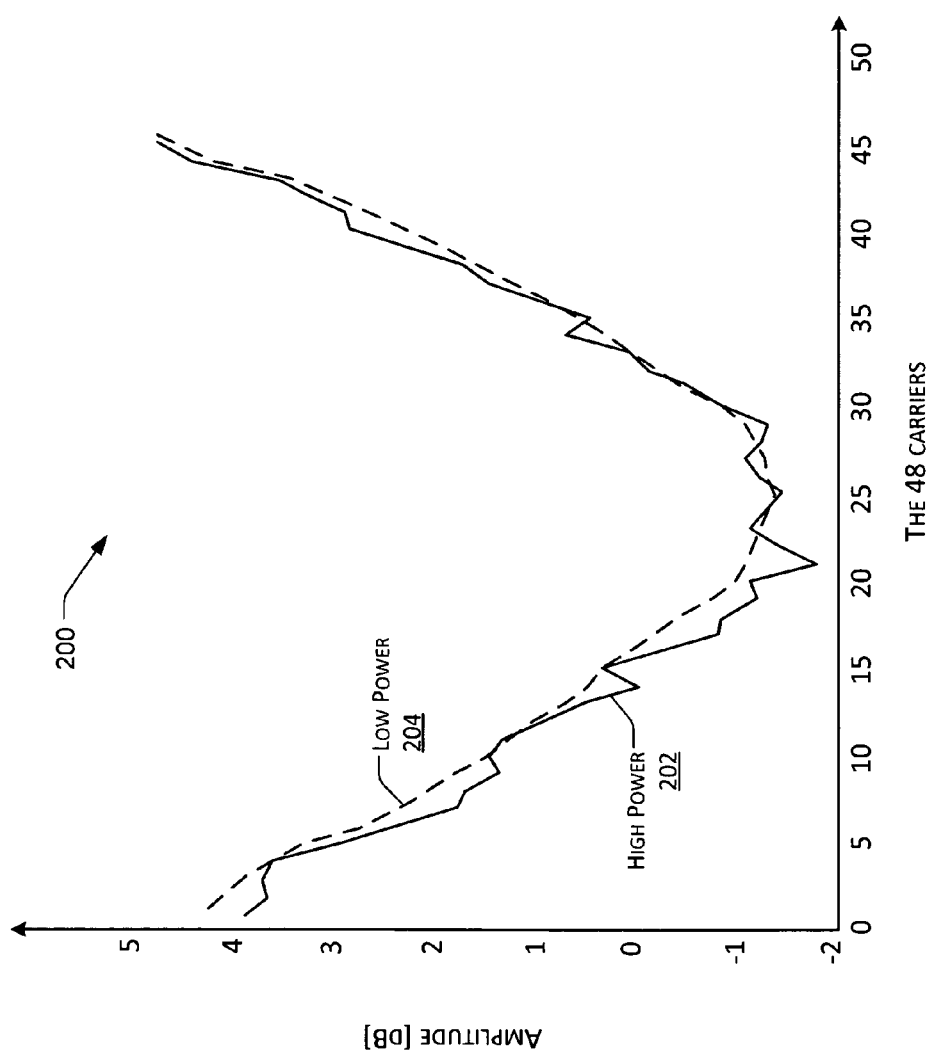
FIG. 2 is an example graph of amplitude channel shape response according to some implementations.

FIG. 2 shows an example graph 200 of amplitude channel shape response. The graph 200 illustrates channel frequency that can be seen a coupling point (i.e., connector 108) for a channel, such as the channel created by PA 116. Graph 200 plots signal carriers against amplitude. A high power curve 202 and low power curve 204 are shown, and illustrate that a full response can be extracted at low power and high power. At high power there can be more noise than low power, due to poor error vector magnitude or EVM; however, after filtering, noise from high power and low power can be very similar. Therefore, equalization can be performed in either high power or low power, if there is a linear response before and after the PA 116.

Figure 3:
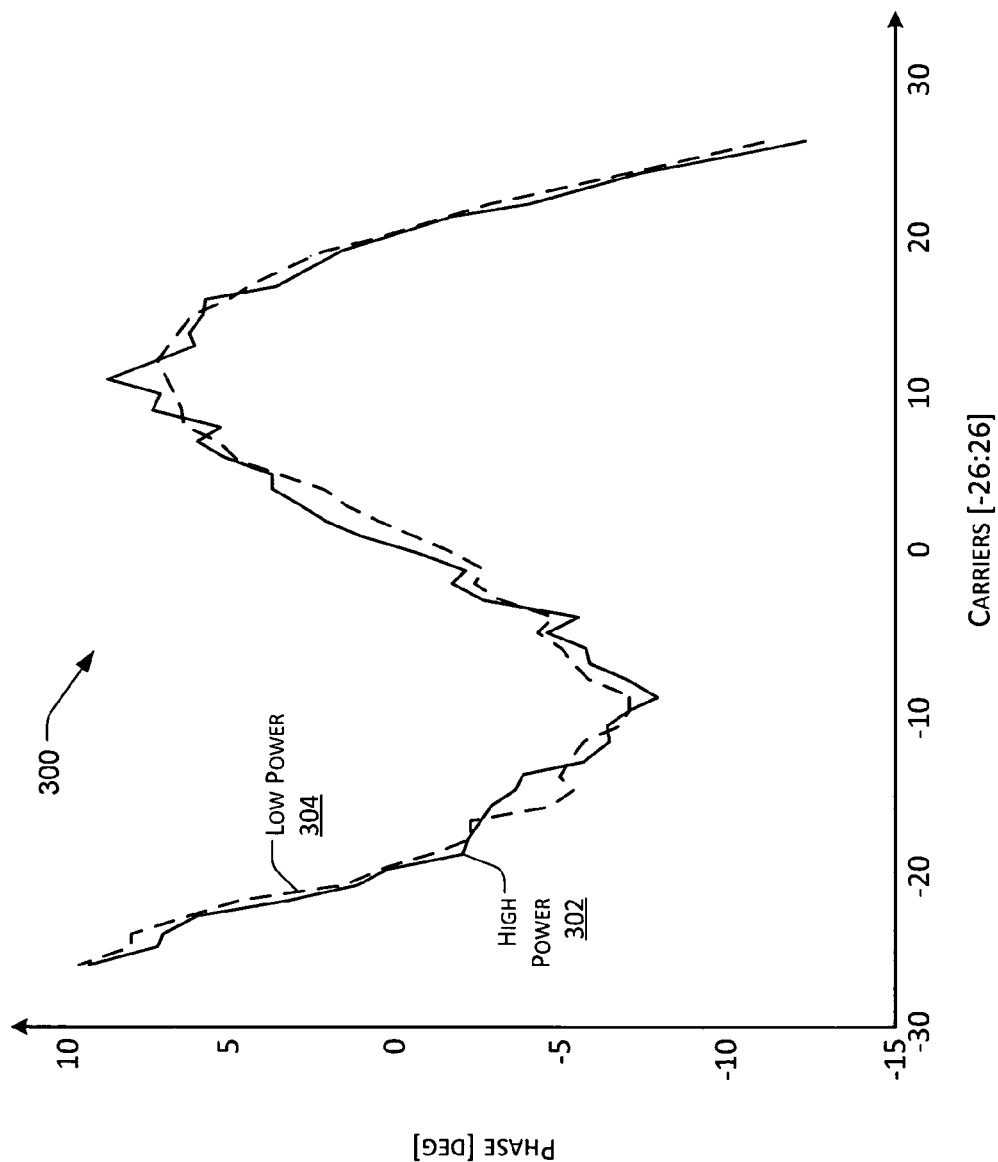
FIG. 3 is an example graph of phase response according to some implementations.

FIG. 3 shows an example graph 300 of phase response. The graph 300 is over the particular channel created by the PA 116. Graph 300 plots signal carriers against phase. A high power curve 302 and low power curve 304 are shown, and illustrate that a full response can be extracted at low power and high power. As illustrated in FIG. 2 and graph 200, graph 300 illustrates that at high power there can be more noise than low power due to poor EVM, and that after filtering, noise from high power and low power can be very similar. Also, graph 300 shows that equalization can be performed in either high power or low power, if there is a linear response before and after the PA 116.

As discussed, in order to get accurate readings of power detection in the close-loop, relative reading measurements can be based on a relative reading using preexisting peak to average power ratio or PAPR detection techniques, with the use of an additional algorithm or process. One implementation includes a transmitted packet, such as an orthogonal frequency domain multiplexing (OFDM) packet. The transmitted packet is used to learn the linear response of a detector at measuring the output of the PA 116. This can be implemented by using a low power transmitted packet. The inherent line linear response of the low power transmitted packet can later be subtracted. Another implementation extracts response from the PA 116 and coupler or connector 108 (i.e., output from the RFIC transceiver 114 and connector 198), from pilot signals, and equalizes a received signal.

For both implementations, after equalization, an AM response is plotted to create a graph from which the derived PAPR value can be extracted. In contrast, if data is just equalized, and a max/rms detection method applied, an inaccurate PAPR reading can result due to filters before and after the PA 116. Therefore, with the implementation of the algorithm or process, which is further described below, an AM response graph for close-loop detector reading implementing the algorithm compares well with an ideal case of a directional coupler reading. Furthermore, a good fit of AM/AM curves between a direct point and coupling point can be achieved. For example, at peak power where compression can be by 4 dB, the difference between AM/AM curves can be less than 0.1 dB.

In general, an equalization process is added to sample at loop-back, and averaging of an AM curve is used to overcome detector response. This calibration process creates a reference packet for equalization, and the algorithm for calibration implements the reference packet. This can lead to a high accuracy measurement of transmitted power in a wireless system (i.e., wireless communication device 100), even with VSWR change at the antenna (i.e., antenna(e) 106). The PAPR method derived from the loop-back together with the new equalization process can provide a robust solution for power measurement.

Figure 4:
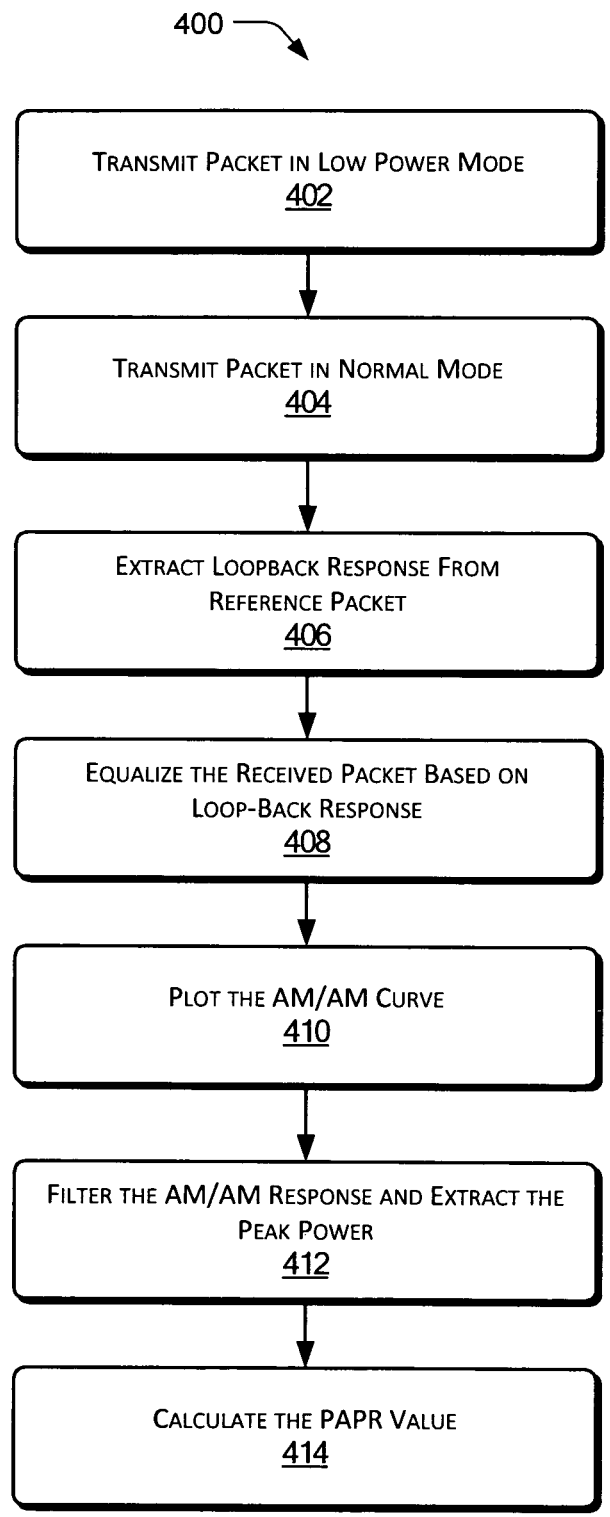
FIG. 4 is a flow chart for performing a calibration for peak to average power ratio or PAPR extraction from a loop-back power reading according to some implementations.

FIG. 4 is a flow chart diagram 400 for an exemplary process for performing a calibration for peak to average power ratio (PAPR) extraction from a loop-back power reading for a wireless communication device. The order in which the method is described is not intended to be construed as a limitation, and any number of the described method blocks can be combined in any order to implement the method, or alternate method. Additionally, individual blocks can be deleted from the method without departing from the spirit and scope of the subject matter described herein. Furthermore, the method can be implemented in any suitable hardware, software, firmware, or a combination thereof, without departing from the scope of the invention.

At block 402, a reference packet is transmitted. The reference packet can be transmitted in lower power mode, and can be an orthogonal frequency domain multiplexing or OFDM packet. In an implementation as discussed above, module 130 of DSP 112 can provide the reference packet.

At block 404, a packet is transmitted in normal mode. This packet is a transmitted signal that is provided regardless of whether other calibration is performed. Normal mode refers to expected or regular transmission power. For example, as discussed above, module 132 of DSP 112 can provide the regular mode packet.

At block 406, a loop-back response is extracted from the reference packet. The loop-back response can be provided by the loop-back chain 122. In particular, the reference packet is divided by the packet transmitted in normal mode, in order to extract the response of the channel that is created by the PA 116. For example, as discussed above, module 136 of driver(s) 104 can perform this extraction.

At block 408, equalization of the received reference packet is performed. As discussed above, an equalization process is added to samples (i.e., received reference packet) at loop-back, and averaging of an AM curve is used to overcome detector response. For example, the equalization can be performed by module 136 of driver(s) 104.

At block 410, an AM/AM curve is plotted. For example, the AM/AM can be derived from the response of loop-back chain 122 as discussed above.

At block 412, the AM/AM curve or response is filtered and peak power is extracted. For example, as discussed above, the module 138 of driver(s) 104 can perform the filtering.

At block 414, the peak to average power ratio or PAPR can be calculated. For example, as discussed above, the module 140 of driver(s) 104 can perform the calculation. In certain implementations, the PAPR result and the AM/PM curves are fed back to the controller and memory 110 and DSP 112, where the DSP 112 can control the transmit (TX) power with accuracy and perform the PAPD for mask and EVM correction based on the results.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. For example, the systems described could be configured as communication devices, computing devices, and other electronic devices.

What is claimed is:

1. A method of performing peak to average power ratio (PAPR) extraction from a loop-back power reading for a wireless communication device comprising:
    transmitting a data packet in normal power mode; and
    transmitting a reference packet in low power mode than the normal power mode;
    extracting a loop-back response by subtracting the data packet from the reference packet;
    equalizing the data based on the loop-back response;
    plotting an AM/AM curve based on the loop-back response;
    filtering the AM/AM curve to extract peak power values; and
    calculating the PAPR value.

2. The method of claim 1, wherein the transmitting the data packet is a normal transmitted signal of the wireless communication device.

3. The method of claim 1, wherein the transmitting the reference packet is an orthogonal frequency domain multiplexing (OFDM) signal.

4. The method of claim 1, wherein the transmitting the reference packet is attenuation mode.

5. The method of claim 1, wherein the extracting includes removing a linear response.

6. The method of claim 1, wherein the look-back response includes non-linear properties.

7. The method of claim 1 further comprising equalizing a received reference packet based on the loop-back response.

8. The method of claim 1, wherein the peak power values are used to reduce error of peak to average power ratio calculation.

9. A wireless communications system comprising:
    a power amplifier;
    a digital signal processor that provides the power amplifier a reference packet and a normal signal packet;
    a loop back chain the receives output from the power amplifier, including a processed reference packet and processed normal signal packet, and
    a module that extracts a linear response by subtracting the processed normal signal packet from the processed reference packet;
    a module that equalizes data based on the loop-back response;
    a module that plots an AM/AM curve based on the loop-back response;
    a module that filters the AM/AM curve to extract peak power values; and
    a module that calculates PAPR value.

10. The wireless communication system of claim 9, wherein the digital signal processor transmits the reference packets in attenuation mode.

11. The wireless communication system of claim 9, wherein the loop back chain includes a receiver that amplifies the output signal and a mixer that receives the amplified signal.

12. The wireless communication system of claim 9 further comprising a detector that measures output of the power amplifier, wherein linear response detector is determined.

13. The wireless communication system of claim 9 further comprising a module implementing a loop back response of the look back chain, that maps AM and PM curves and fits the curves to a reversible averaged mapping.

14. The wireless communication system of claim 9 further comprising a directional coupler to reduce channel errors from the power amplifier.

* * * * *